United States Patent
Piel

[11] 3,786,703
[45] Jan. 22, 1974

[54] FRANKFURTER CUTTING AND SCORING APPARATUS
[75] Inventor: David Piel, New York, N.Y.
[73] Assignee: Round Dog Corporation of America, New York, N.Y.
[22] Filed: Oct. 10, 1972
[21] Appl. No.: 296,060

[52] U.S. Cl............................. 83/10, 83/11, 83/12, 83/113
[51] Int. Cl............................................. B26d 3/08
[58] Field of Search ...... 83/6, 9, 10, 12; 17/1 F, 25; 83/11, 113

[56] References Cited
UNITED STATES PATENTS
2,263,869  11/1941  Bundschu ........................... 83/12 X
3,367,379  2/1968  Ryan et al. ......................... 17/1 F X

*Primary Examiner*—Willie G. Abercrombie
*Attorney, Agent, or Firm*—Sidney G. Faber et al.

[57] ABSTRACT

A device for the continuous and rapid cutting and scoring of frankfurters is described and comprises a rotatable annular shaped planar cutting means, a plurality of transverse cutting means mounted at spaced intervals along the periphery of said annular cutting means, and means associated with said cutting means for guiding a frankfurter into a position such that the frankfurter is cut and scored but not severed by said cutting means.

15 Claims, 3 Drawing Figures

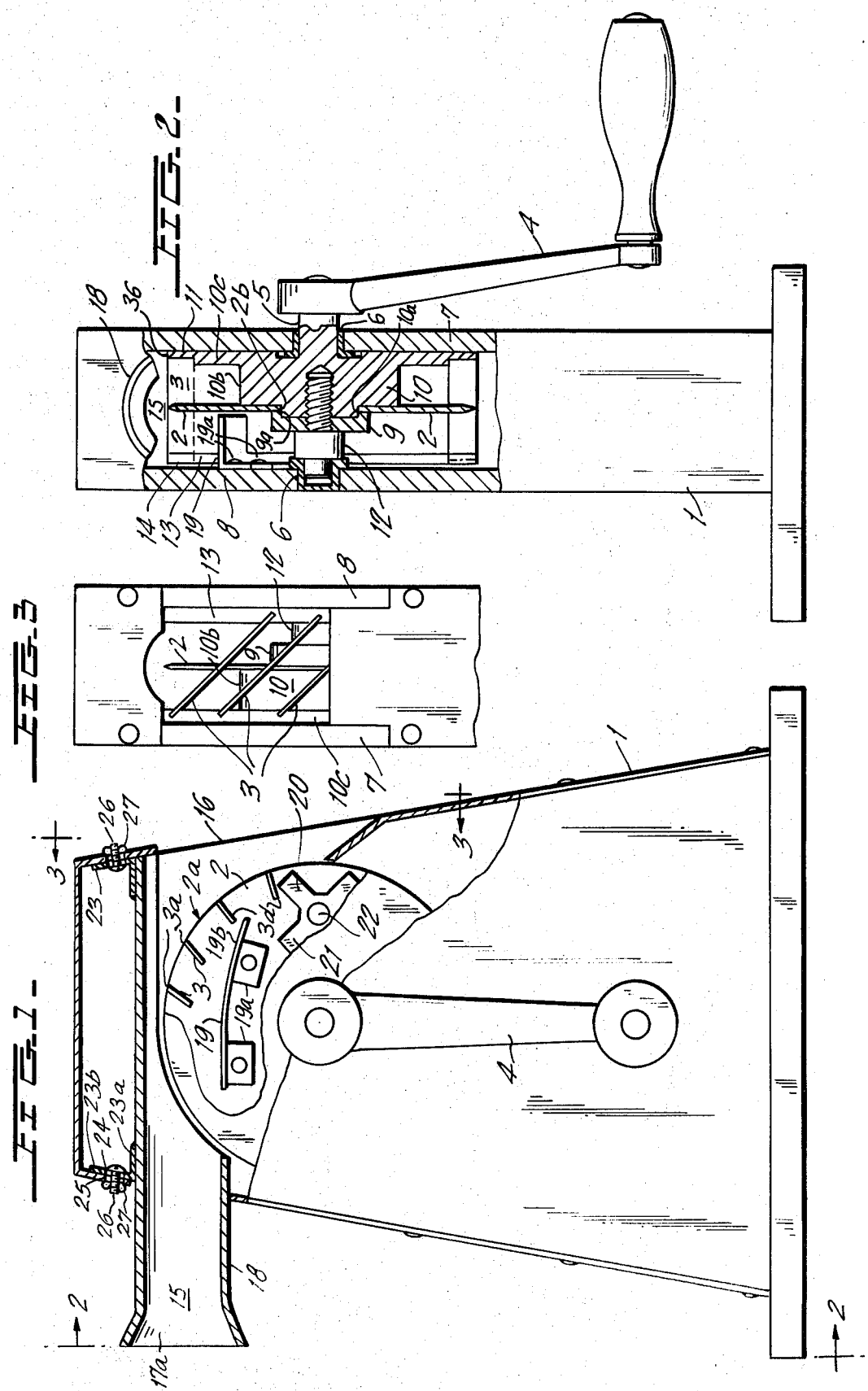

FRANKFURTER CUTTING AND SCORING APPARATUS

Numerous devices have been proposed for the cutting and/or scoring of frankfurters. Such devices have used stationary, movable or rotating cutting blades and a few devices are adapted for continuous cutting.

The present invention provides a new and unique apparatus for the cutting and scoring of frankfurters and converts the conventional "hot dog" into a "round dog." The present device provides one elongated cut along the lengthwise direction of the frankfurter through a portion of its diameter and simultaneously provides a plurality of transversely aligned cuts through a portion of its diameter. When the longitudinal and transverse cuts are at an acute angle in the same plane, the frankfurter will curl into a round shape when cooked. As a result, a round hamburger roll or bun can be used instead of the straight frankfurter roll. Additionally, the "round dog" on a bun presents an empty center portion which can be filled with any desired food or condiment so as to provide a suitable central region for receiving an endless array of culinary delicacies.

The scoring of the frankfurter also serves to change the flavor thereof. Thus, when a pure beef frankfurter is deep fried, the salt is drawn out of the meat as a result of the scoring giving the meat a heartier flavor.

The present apparatus has the advantage of rapid cutting and scoring of the frankfurters and is adapted to provide continuous cutting and scoring as may be required on a production line. The apparatus also provides a novel way of preventing the frankfurter from sticking to the blade and disengaging the frankfurter from the blade.

SUMMARY OF THE INVENTION

This invention relates to a device for the continuous and rapid cutting and scoring of frankfurters and more particularly to a device for the continuous and rapid cutting and scoring of frankfurters comprising in combination a rotatable annular cutting means disposed in a plane, a plurality of cutting means mounted at spaced intervals to and disposed transversely to the periphery of said annular cutting means, and means associated with said cutting means for guiding a frankfurter into a position such that the frankfurter is cut and scored but not severed by said cutting means.

Accordingly, one object of this invention is to provide a simplified device for the continuous rapid cutting and scoring of frankfurters. This and other objects of the invention will become apparent to those skilled in the art from the following detailed description in which FIG. 1 is a side view, partially cut away, of one embodiment of the invention;

FIG. 2 is a partially cut away view along 2-2 of FIG. 1; and

FIG. 3 is a partially cut away view along 3-3 of FIG. 1.

DETAILED DESCRIPTION OF THE INVENTION

As shown in the Figures, the apparatus of the present invention is contained within a housing 1 which can be of any desired shape or configuration. Disposed within housing 1 is a rotatable annular cutting means 2. In this embodiment, cutting means 2 is a planar member having a circular blade edge 2a along its periphery and is centrally positioned within housing 1. Mounted along the side of blade 2 near its periphery are a plurality of cutting means 3 which are also disposed transversely to cutting means 2. The cutting means 3 are each provided with straight cutting edges 3a. When viewed in the same plane, cutting means 2 and 3 can be positioned in any desired angle and when it is desired to produce the "round dog" the angle is preferably less than 90°.

The rotatable cutting means 2 can be rotated by any desired means. In the embodiment shown, a crank 4 connected to a rotatable shaft 5 extending horizontally between bushings 6,6 in the front and rear mounting plates 7 and 8 is used. It will be understood, however, that any conventional means for rotating the blade can be used.

The rotatable blade 2 in the Figures is secured between a collar 9 and a rotatable supporting hub 10 to cooperatively couple blade 2 to rotatable shaft 5. Hub 10 has a raised central portion 10a which is inserted into central opening 2b in blade 2 and into the circular recess 9a in collar 9. The circular periphery 10b of hub 10 extends away from blade 2 and lies below the path of movement of the frankfurter. The right-hand end of hub 10 (relative to FIG. 1) extends outwardly to form the peripheral portion 10c for supporting one end 3b of each of the cutting means 3 by means of a plurality of slots 11. A washer 12 is provided on shaft 5 and is mounted between blade 2 and bushing 6 mounted on the rear mounting plate 8. A rotatable ring 13 is provided next to rear mounting plate 8 and serves to support the remaining ends 3c of each of the cutting means 3 by means of a plurality of slots 14.

A tubular passageway 15 is provided through housing 1. It will be understood by those skilled in the art that the passageway extending through the housing need not be tubular but can take any desired configuration. The diameter of the passageway 15 is greater at the exit end 16 thereof than the diameter at point 17 where it enters housing 1. The left-hand end of passageway 15 is provided with an outwardly flared opening 17a to facilitate insertion of a frankfurter. The peripheral portion of cutting blade 2 projects into passageway 15. The passageway 15 serves to guide the frankfurter into the housing 1 and into contact with cutting means 2 and 3. The surface 18 of passageway 15 which is closest to the axis of rotation of blade 2 terminates just before blade 2 and then resumes at a point just beyond cutting blade 2 and about in line with the axis of rotation and continues to the exit end of housing 1. This arrangement is necessary in order to allow transverse cutting means 3 to cut the frankfurter and to prevent the transverse cutting means 3 from tearing the frankfurters when cutting means 2 is rotated.

A frankfurter is inserted into passageway 15 and proceeds substantially horizontally toward rotatable blade 2. When in contact with blade edge 2a, the frankfurter is pulled through the apparatus by the rotation of blade 2 and transverse cutting means 3. When blade 2 is rotated clockwise (relative to FIG. 1), the frankfurter is pulled in the same direction by blades 2 and 3. The blades will exert a force which would generally be sufficient to bring all of the frankfurter in contact with cutting blade 2 resulting in the frankfurter being severed. In order to prevent this, a stripper plate 19 is provided. Stripper plate 19 is secured to the interior of mounting plate 8 by fasteners 19a. The left-hand end is parallel to and in alignment with surface 18. The right-hand end 19b is curved downwardly to provide clearance between stripper plate 19 and the inner edges 3d of transverse cutting means 3. Stripper plate 19 prevents the frankfurter from being completely severed by urging the frankfurter upwardly as it moves along passageway 15 and further serves to partially "strip" the frankfurter from the transverse cutting means 3, and causes at least partial "stripping" of the frankfurter from blade 2.

An idler stripper 20 is provided to completely disengage the frankfurter from the cutting means 2 and 3 as it passes through the exit end of the passageway 15. Idler stripper 20 is rotatably mounted to the interior of mounting plate 8 by pin 22 and has a plurality of legs 21 extending radially from the center of stripper 20 toward the cutting blade periphery 2a of cutter 2. Stripper 20 is rotated when a blade 3 comes in contact with one of the legs 21 causing the free ends of legs 21 to push the frankfurter away from blades 2 and 3.

Two L-shaped brackets 23 are provided so that passageway 15 can be positioned as desired relative to cutting means 2 for the purpose of controlling the depth of the cuts made in a frankfurter by the cutters 2 and 3. The ability to control the depth of the cuts in the frankfurter is advantageous because the depth necessary to produce the "round dog" may vary depending upon the method used to cook the frankfurter. The base portion 23a of bracket 23 is joined to the outer surface of surface 18 in any suitable manner, such as by welding. The upright portion 23b of of bracket 23 has an elongated opening 24 therein. Upright portions 23b,23b are positioned adjacent to mounting plates 7 and 8, respectively, such that openings 24,24 are adjacent to corresponding elongated openings 25,25 in plates 7 and 8. Bracket 23 is held in a fixed position by a bolt 26 which extends through openings 24 and 25, and a thumb screw 27. The openings provided in housing 1 through which passageway 15 passes are preferably of a diameter greater than passageway 15 to permit the adjustment of passageway 15.

It will be recognized by those skilled in the art that the apparatus has been constructed so as to allow easy assembly and disassembly for the purpose of providing maintenance and cleaning in accordance with local health regulations.

Various changes and modifications can be made in the apparatus of the present invention without departing from the spirit and scope thereof. The various embodiments set forth herein serve to further illustrate the invention but are not intended to limit it.

I claim:

1. An apparatus for the continuous and rapid cutting and scoring of frankfurters comprising, in combination, a rotatable annular first cutting means having an annular shaped cutting edge, a plurality of transverse cutting means mounted at spaced intervals along said first cutting means and adjacent the cutting edge of said first cutting means, and means for guiding a frankfurter into a position such that the frankfurter is cut and scored but not severed by said cutting means as said frankfurter passes therethrough.

2. The apparatus of claim 1 wherein said rotatable annular cutting means is centrally disposed within a housing.

3. The apparatus of claim 2 wherein said rotatable annular cutting means is mounted on a rotatable shaft mounted within said housing.

4. The apparatus of claim 1 further comprising means associated with said rotatable annular cutting means to provide support for a frankfurter as it is engaged and cut by said first cutting means to prevent the frankfurter from being completely severed by said rotatable first cutting means and to strip said frankfurter from said first cutting means as it passes through said guiding means.

5. The apparatus of claim 4 wherein said supporting means comprises a stripper late secured to said housing and positioned inwardly from the cutting edge of said first cutting means and said transverse cutting means to urge a frankfurter away from the cutting edges of said first cutting means and said transverse cutting means.

6. The apparatus of claim 5 wherein a portion of said stripper plate is curved to a lesser extent than the peripheral cutting edge of said first cutting means.

7. The apparatus of claim 1 further comprising rotatable idler means selectively engaged by said transverse cutting means to completely strip a frankfurter from both said first cutting means and said transverse cutting means as said first cutting means is rotated.

8. The apparatus of claim 7 wherein said idler means is a freely rotatable body having a plurality of radially aligned legs adapted to extend from the center of rotation of said body to beyond the cutting edges of said first cutting means and said transverse cutting means.

9. An apparatus for the continuous and rapid cutting and scoring of frankfurters comprising, in combination, a housing; a rotatable shaft mounted in said housing; means for rotating said rotatable shaft; a rotatable annular cutting means mounted to said rotatable shaft; a plurality of transverse cutting means mounted at spaced intervals along the peripheral portion of said annular cutting means; means extending through said housing and adapted for guiding a frankfurter through said housing, said means being disposed such that said rotatable annular cutting means and said transverse cutting means extend at least partially into said guiding means; and stripper means mounted in said housing for supporting a frankfurter as it comes in contact with said rotatable annular cutting means so as to prevent the frankfurter from being completely severed by said rotatable annular cutting means and to strip said frankfurter away from said rotatable annular cutting means.

10. The apparatus of claim 9 further comprising rotatable idler means selectively engaged by said transverse cutting means to completely strip a frankfurter from both said first cutting means and said transverse cutting means as said first cutting means is rotated.

11. The apparatus of claim 10 wherein said rotatable shaft is mounted horizontally in said housing; said annular cutting means is centrally disposed within said housing; and wherein said guiding means extending through said housing is tubular.

12. The apparatus of claim 11 wherein said stripper means comprises a stripper plate secured to said housing and positioned inwardly from the cutting edge of said first cutting means and said transverse cutting means to urge a frankfurter away from the cutting edges of said first cutting means and said transverse cutting means.

13. The apparatus of claim 12 wherein said idler means is a freely rotatable body having a plurality of radially aligned legs adapted to extend from the center of rotation of said body to beyond the cutting edges of said first cutting means and said transverse cutting means.

14. The apparatus of claim 13 wherein said rotatable annular cutting means is circular.

15. The apparatus of claim 14 further comprising means for positioning said tubular guiding means relative to said cutting means to control the depth of the cuts formed in a frankfurter as it passes through said guiding means.

* * * * *